US006997650B2

(12) United States Patent
Voigt et al.

(10) Patent No.: US 6,997,650 B2
(45) Date of Patent: Feb. 14, 2006

(54) HELICAL ROTARY CUTTER AND METHOD

(75) Inventors: William R. Voigt, Essexville, MI (US); Dennis F. Sauer, Kawkawlin, MI (US)

(73) Assignee: William R. Voight, Essexville, MI (US)

( * ) Notice: Subject to any disclaimer, the term of this patent is extended or adjusted under 35 U.S.C. 154(b) by 769 days.

(21) Appl. No.: 09/766,025

(22) Filed: Jan. 19, 2001

(65) Prior Publication Data

US 2002/0028115 A1 Mar. 7, 2002

Related U.S. Application Data

(60) Provisional application No. 60/177,488, filed on Jan. 21, 2000.

(51) Int. Cl.
  *B23B 27/00* (2006.01)
  *B23C 5/00* (2006.01)
(52) U.S. Cl. .......................................... 407/35; 407/43
(58) Field of Classification Search .................. 407/35, 407/43, 47, 49, 51, 53, 59, 63; 83/13, 349, 83/508.3, 674
See application file for complete search history.

(56) References Cited

U.S. PATENT DOCUMENTS

| 3,672,017 | A | * | 6/1972 | Nielsen et al. ................ 407/49 |
| 3,701,187 | A | * | 10/1972 | Erkfritz ....................... 407/113 |
| 3,776,289 | A | * | 12/1973 | Boboltz et al. ............. 144/230 |
| 3,899,813 | A | * | 8/1975 | Lovendahl ................... 241/294 |
| 5,163,490 | A | * | 11/1992 | Meis ....................... 144/117.1 |
| 5,800,079 | A | * | 9/1998 | Qvarth ....................... 144/230 |
| 6,126,364 | A | * | 10/2000 | Riviere ........................ 407/15 |
| 6,247,389 | B1 | * | 6/2001 | Samuels et al. ............... 83/13 |

* cited by examiner

*Primary Examiner*—Boyer D. Ashley
*Assistant Examiner*—Dana Ross
(74) *Attorney, Agent, or Firm*—Reising, Ethington, Barnes, Kisselle & Learman, P.C.

(57) ABSTRACT

The helical rotary cutter includes a cylinder with a plurality of grooves that extend from one cylinder end to the other end. Each groove has a leading groove wall and a trailing groove wall. The leading groove is in a first wall plane that extends outwardly away from the rotor axis in the direction of rotation and intersects the rotor axis. The trailing groove wall is in a second wall plane that extends outwardly away from the rotor axis in the direction of rotation and intersects the rotor axis. A plurality of first base support surfaces are each in a base support plane, perpendicular to the first wall plane and intersect each other. A plurality of second base support surfaces are each in a base support plane, perpendicular to the second wall plane and intersect each other. A rectangular flat cutter blade is clamped to each base support surface.

13 Claims, 4 Drawing Sheets

HELICAL ROTARY CUTTER AND METHOD

TECHNICAL FIELD

This invention relates to a rotary helical cutter with replaceable straight flat blades. The disclosure incorporates the helical rotary cutter and method disclosed in provisional patent application No. 60/177,488, filed Jan. 21, 2000, whose priority is claimed for this application.

BACKGROUND OF THE INVENTION

Rotary cutters are employed to cut material passing through extrusion dyes into pellets. For high volume production, one rotary cutter assembly cuts material passing through a number of extrusion passages simultaneously.

Helical cutter blades are preferred to reduce noise, lower vibration and reduce peak loads on the power source. However, helical blades are difficult to manufacture and to sharpen. If the material being cut is relatively rigid, there can be some space between the cutting edges on a driven rotor and the extrusion dye. However, if the material to be cut is somewhat soft, the space between a cutting edge and a dye port must be reduced to near zero to obtain a clean cut.

A rotor for cutting that is currently in use has a plurality of slots that extend the length of the rotor. Each slot extends from one end to the other of the rotor at a slight angle relative to the axis of rotation to provide a helix angle. Each slot also has a cutter blade base support surface that is in a flat plane extending the length of the rotor. A straight blade is supported on the base support. Due to an hourglass effect, the rotor radius extending from the axis of the rotor to the cutting edge of the blade is substantially larger at both ends of the rotor than it is in the center of the blade. To correct for the hourglass effect a plurality of cutter segments are mounted on each base support. The width, in a radial direction, of each cutter segment is varied to correct for the hourglass effect.

The cutter blades are made from special cutter blade materials. These materials are difficult to shape and sharpen. To form a cutting edge on all the cutter blade segments that are within the required range of accuracy it is necessary to mount a complete set of blades on a rotor, mount the rotor in a machine tool and grind the cutting edges to the required shape and dimensions. A rotary cutter with blade segments that have to be ground after the segments are mounted on the rotor is not repairable in the field. If one blade is damaged it is often necessary to remove the rotor from the machine and send it to the manufacturer for repair or blade sharpening.

SUMMARY OF THE INVENTION

The base support surface of the rotor is machined in base support sections. Each base support section is the length of one of the blades. The ends of each base support section are a fixed radial distance from the axis of rotation of the cutter rotor. Adjacent base support surfaces are in intersecting planes. No two adjacent base support surfaces are in the same plane. Each cutter blade has an hourglass effect. By shortening each blade section and the base support surface, the error due to the hourglass effect is reduced. As the length of each blade section and each base support surface approaches zero, the hourglass effect error also approaches zero.

The base support surfaces are machined starting at one end of the rotor. At the end of each base support surface section, the path of movement of the cutting or grinding tool is changed.

BRIEF DESCRIPTION OF THE DRAWINGS

The presently preferred embodiment of the invention is disclosed in the following description and in the accompanying drawings, wherein.

DESCRIPTION OF THE PREFERRED EMBODIMENT

Figure 1:
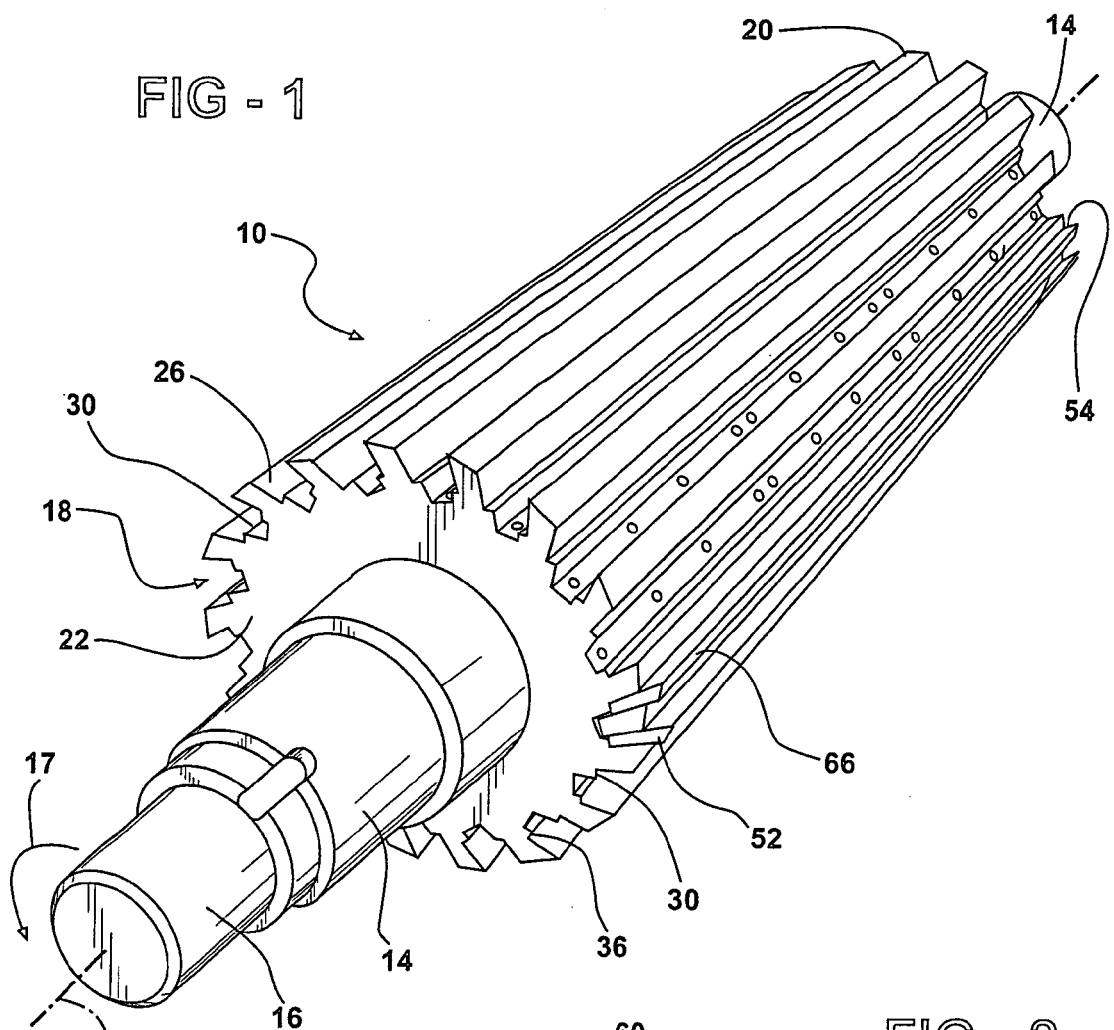
FIG. 1 is a perspective view of the rotor with blades mounted in one groove only.

The rotor 10, as shown in FIG. 1, is machined from a stainless steel cylinder to form a shaft with an axis of rotation 12. Cylindrical bearing supports 14 are provided on each end. Rotor drive connectors 16 are small diameter projections outboard of the bearing support 14 on both ends of the rotor 10. A drive connector 16 is shown on only one end of the rotor 10 in FIG. 1. The rotor 10 is driven in the direction indicated by the arrow 17 in FIG. 1.

Figure 2:
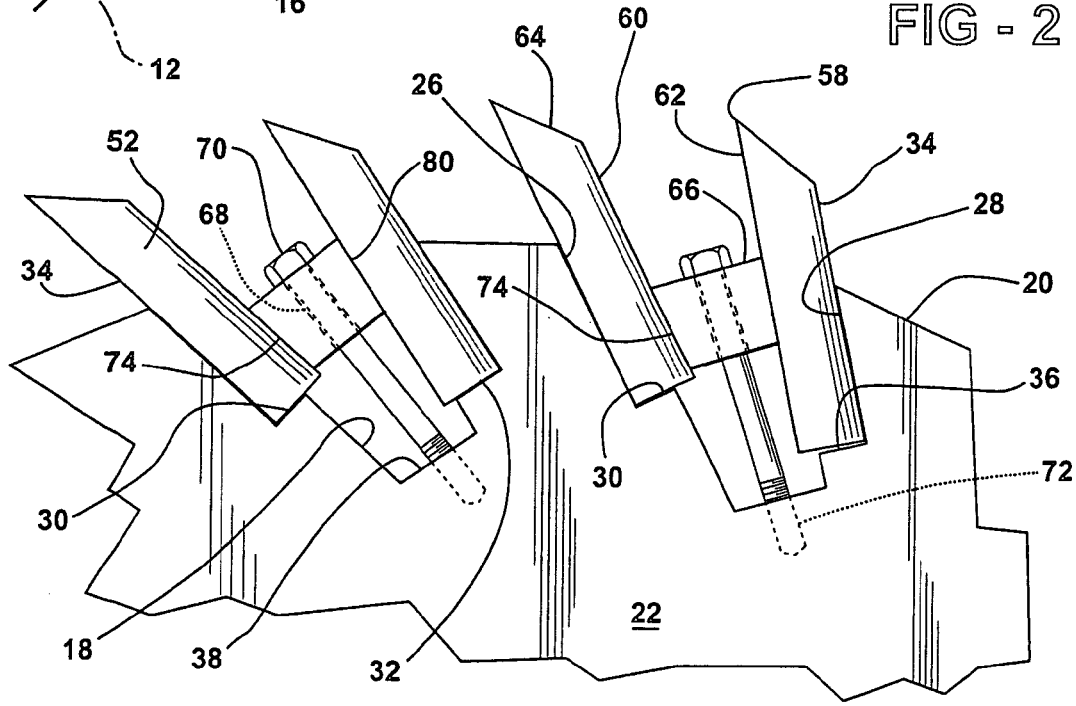
FIG. 2 is an enlarged end view showing the grooves in the rotor with parts broken away.

Grooves 18, shown in FIG. 2 are machined into the outer periphery 20 of the rotor 10. These grooves 18 extend from the left end 22 to the right end 24. Each groove 18 is at an angle θ to the axis 12 to provide a helix.

The grooves 18 have a leading groove wall 26 and a trailing groove wall 28. A base support surface 30 supports the base 32 of a straight flat blade 34 adjacent to the leading groove wall 26 in each groove 18. A base support surface 36 supports the base 32 of a straight flat blade 34 adjacent to the trailing wall 28 in each groove 18. The groove floor 38 in each groove 18 is spaced radially inward from the base support surfaces 30 and 36. The leading wall 26 of each groove 18 is in a plane that extends from the left end 22 to the right end 24. The trailing wall 28 of each groove 18 is also in a plane that extends from the left end 22 to the right end 24.

Figure 3:
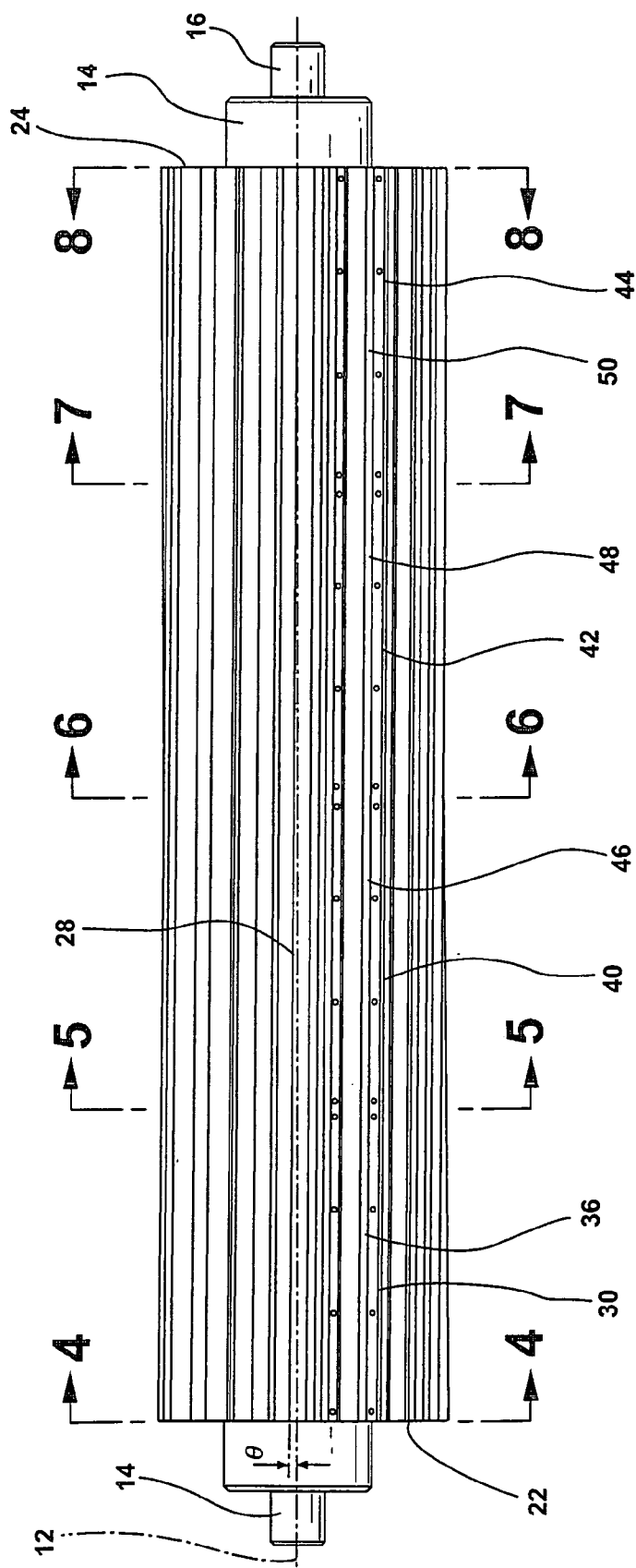
FIG. 3 is a plan view of the rotor without blades.
Figure 4:
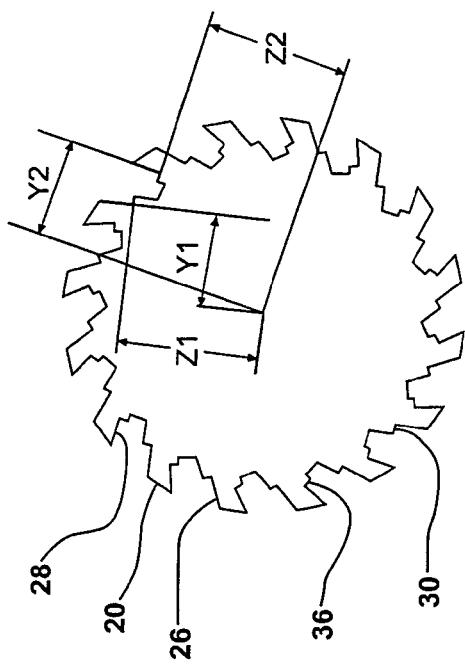
FIG. 4 is a left end view of the rotor taken along line 4—4 in FIG. 3.

The base support surface 30 in each groove 18 extends only from the left end 22 to the section line 5—5 shown in FIG. 3. The surface 30 is in a plane and supports a left end section blade 34. A base support surface 40 intersects the surface 30 and extends from the section line 5—5 to the section line 6—6 and supports a section blade 34. A base support surface 42 intersects the surface 40 and extends from the section line 6—6 to the section line 7—7 and supports a section blade 34. A base support surface 44 intersects the surface 42 and extends from the section line 7—7 to the right end 24 and supports a section blade 34.

The base support surface 36 in each groove 18 extends only from the left end 22 to the section line 5—5 shown in FIG. 3. The surface 36 is in a plane and supports a left end section blade 34. A base support surface 46 intersects the surface 36 and extends from the section line 5—5 to the section line 6—6 and supports a section blade 34. A base support surface 48 intersects the surface 46 and extends from the section line 6—6 to the section line 7—7 and supports a section blade 34. A base support surface 50 intersects the surface 48 and extends from the section line 7—7 to the right end 24 and supports a section blade 34.

Figure 9:
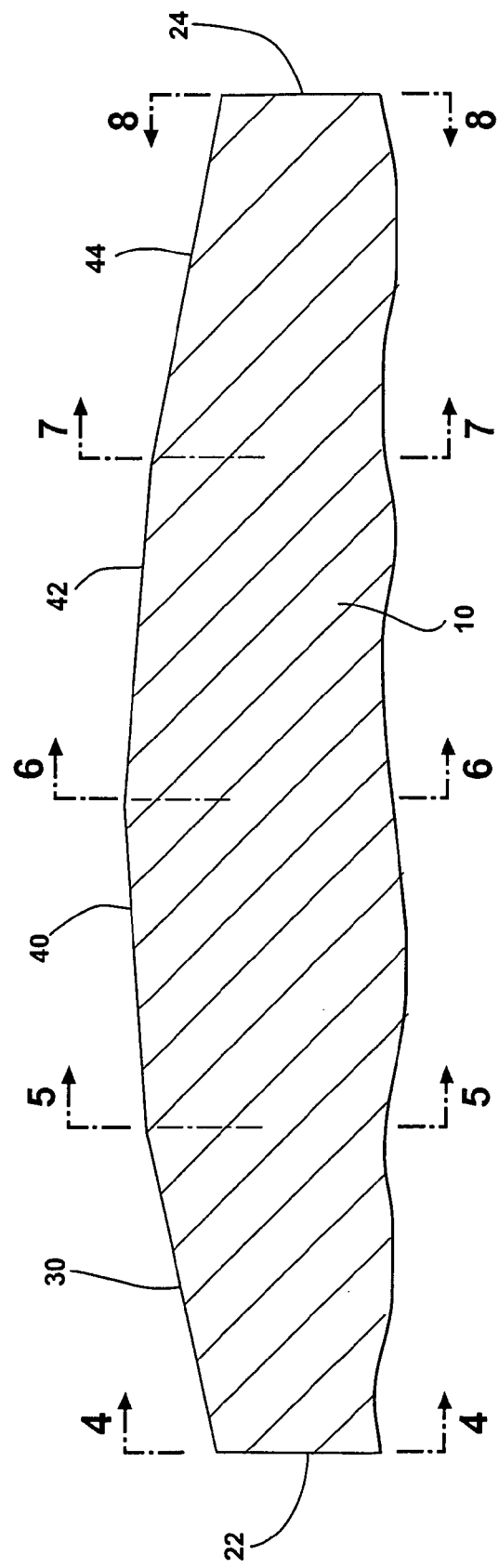
FIG. 9 is a schematic showing a relationship of joined base support surfaces relative to each other.
Figure 5:
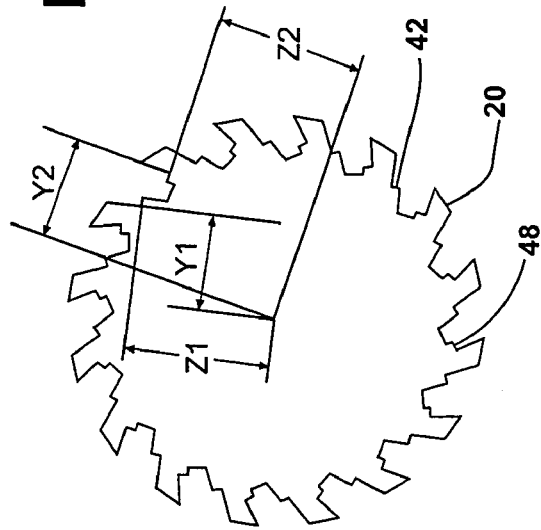
FIG. 5 is a sectional view taken along line 5—5 in FIG. 3.
Figure 6:
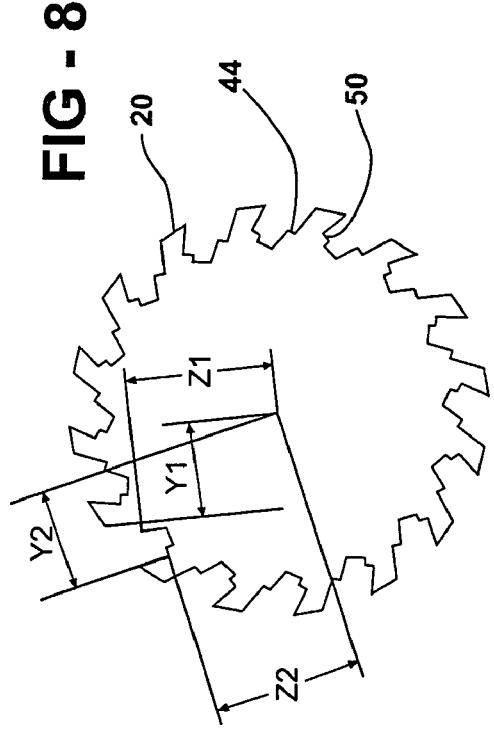
FIG. 6 is a sectional view taken along line 6—6 in FIG. 3.
Figure 7:
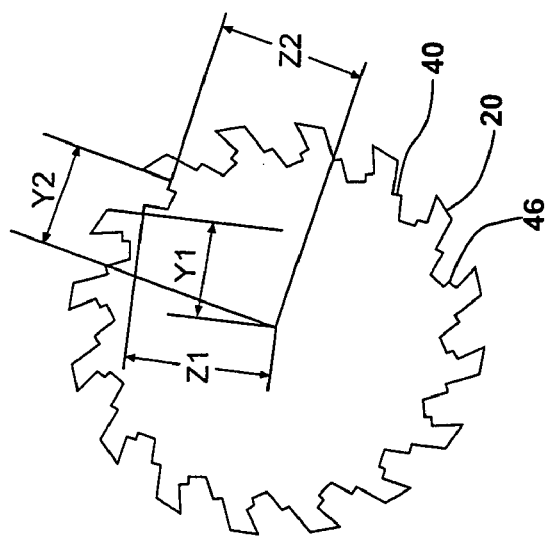
FIG. 7 is a sectional view taken along line 7—7 in FIG. 3.
Figure 8:
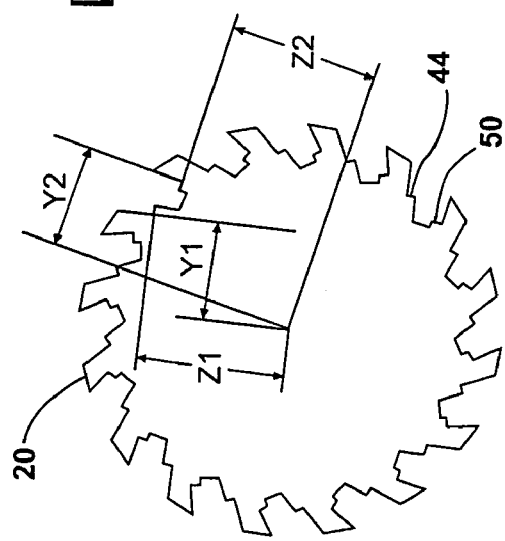
FIG. 8 is a right end view taken along line 8—8 in FIG. 3.

FIG. 9 is a schematic showing the relationship between the planes with the blade support surfaces 30, 40, 42, and 44.

FIGS. 4–8 shows the location of the starting and ending points of the blade support surfaces 30, 40, 42 and 44, in a cartesian coordinate system. The rotor 10 in the example shown in FIGS. 1 and 2 is a metric unit manufactured in a machining center that is programmed in inches. The machining center can also be programmed in a polar coordinate system as well as in metric units. The end result would be the same regardless of the programming employed by the machining center.

The minimum distance from the axis of rotation 12 to the planes including the leading groove walls 26 and a trailing groove wall 28 is indicated by the references Y1 and Y2 respectively. The minimum distances from the axis of rotation 12 to planes including the ends of the base support surfaces 30, 40, 42 and 44 is indicated by the reference Z1. The minimum distance from the axis of rotation 12 to planes including the ends of the base support surfaces 36, 46, 48 and 50 is indicated by the references Z2. The values of Y and Z depend upon a number of factors including rotor lengths, rotor diameter, the length of the blades 34, and the angle θ of the helix.

The following chart shows the values of the distances Z1 and Z2 for a rotor with a helix angle θ of 1°, a specific length, diameter, and other variable dimensions, with the dimensions to the nearest ten thousandth of an inch.

| Plane | Z1 | Z2 |
| --- | --- | --- |
| Section 4—4 (FIG. 4) | 2.7350 | 2.7350 |
| Section 5—5 (FIG. 5) | 2.6830 | 2.6830 |
| Section 6—6 (FIG. 6) | 2.6250 | 2.6250 |
| Section 7—7 (FIG. 7) | 2.5560 | 2.5560 |
| Section 8—8 (FIG. 8) | 2.4830 | 2.4830 |

The cutter blades 34 are rectangular member. Each blade 34 has end surfaces 52 and 54, a base surface 32 and a cutting edge 58. Each blade 34 also has a front face 60, a back face 62 and a beveled surface 64.

Two straight flat blades 34 are mounted in each groove 18 in one groove section. One blade 34 has its base 32 on the base support surface 30 and another blade has its base on the base support surface 36. A wedge block 66 is placed between the two blades 34. Bolts 70 pass through bores 68 through the wedge block 66 and screw into threaded bores 72 in the rotor 10. When the bolts 70 are tightened, they urge the wedge block 66 toward the groove floor 38 and the axis of rotation 12, urge one blade 34 toward the base support surface 30 and the leading wall 26 and urge the other blade toward the base support surface 36 and the trailing wall 28. One wedge face 74 of each wedge block 66 contacts the front face 60 of a blade 34. The other wedge face 80 contacts the back face 62 of a blade 34. The bases 32 of the blades 34 in each groove 18 adjacent to the end 22 as well as to the end 24 are closer together than the bases of the blades on the support surfaces 40 and 46 as well as the support surfaces 42 and 48. The wedge blocks 66 are shaped to accommodate these differences in spacing. The wedge blocks 66 adjacent to the ends 22 and 24 of the grooves 18 are relatively narrow. The wedge blocks 66 that are midway between the ends 22 and 24 of the grooves 18 are relatively wide.

The rotor 10 as described above has eight blades 34 in each groove 18. There are a total of sixteen grooves 18 and one hundred twenty-eight blades 34. All of these blades 34 are identical to each other. As a result the blades 34 can be changed in the field and can also be sharpened in the field. The rotor 10 as described above with blades 34 that are 200 mm long, mounted on a rotor that is 200 mm in diameter and that has a helix angle θ of 10 has a decreased diameter in the center of the blade 34 of about 0.0015 ten thousandths of an inch. This is generally satisfactory for cutting most materials. The hourglass effect can be decreased further by decreasing the length of the blades 34 and adding additional base support surfaces 30 that fit the blades. The hourglass effect can also be varied by changing the helix angle θ.

The rotor 10 as described above has groups of four blades that abut each other in an end to end relationship and contact either a leading wall 26 or a trailing wall 28. The rotor 10 can be lengthened or shortened as desired and blades 34 can be added or removed to accommodate the rotor length. The limitations on the length of the rotor 10 is the strength of the rotor and rotor deflection. The rotor diameter can also be increased or decreased.

The rotor construction disclosed above permits the use of standard blades 34. By using blades with a standard size, a grinder employing the rotor 10 can be repaired in the field using tools that are normally available. The repair of a rotor with a few nicked blades 34 could be completed in a few minutes to a few hours. Replacement of all the blades 34 on a rotor 10 can be completed within a few hours without removing the rotor from the machine. The repair of a rotor 10 with blades that are ground to correct the hourglass effect may take a few weeks or even months.

The blades 34 are made from tungsten carbide or other materials with similar or better wear-resistant properties. When grinding material that is less abrasive, the blades 34 can be made from a material that is somewhat softer than tungsten carbide if reduced blade life is acceptable.

The disclosed embodiment is representative of a presently preferred form of the invention, but is intended to be illustrative rather that definitive thereof. The invention is defined in the claims.

What is claimed is:

1. A helical rotary cutter comprising:

a rotor having an outer surface, a left end, a right end, a rotor axis, a left end bearing support concentric with the rotor axis and extending axially to the left of the left end, and a right end bearing support concentric with the rotor axis and extending axially to the right of the right end;

a plurality of grooves in said rotor extending from the left end to the right end;

a first groove wall in a first wall plane extending axially from the left end to the right end, extending outward away from the rotor axis and in the direction of rotation, and wherein said first wall plane intersects the rotor axis;

a plurality of first base support surfaces, that are each in a base support plane that is perpendicular to the first wall plane and wherein all the base support planes that are perpendicular to said first groove wall intersect each other;

a plurality of first rectangular flat cutter blades each of which has a left blade end, a right blade end, a cutting edge and a base that is parallel to the cutting edge and wherein the base of each of the plurality of first rectangular cutter blades is seated on one of the plurality of first base support surfaces; and at least one clamp member clamping the plurality of first rectangular flat cutter blades to the first groove wall.

2. A helical rotary cutter as set forth in claim 1 wherein the first groove wall is a trailing groove wall.

3. A helical rotary cutter as set forth in claim 1 wherein the first groove wall is a leading groove wall.

4. A helical rotary cutter as set forth in claim 1 including a second groove wall in a second wall plane extending axially from the left end to the right end, extending outward away from the rotor axis and in the direction of rotation, and wherein said second wall plane intersects the rotor axis;

a plurality of second base support surfaces, that are perpendicular to said second groove wall, and that are each in a second base support plane that is perpendicular to the second wall plane and wherein all the second base support planes that are perpendicular to said second wall plane intersect each other;

a plurality of second rectangular flat cutter blades each of which has a left blade end, a right blade end, a cutting edge and a base that is parallel to the cutting edge and wherein the base of each of the plurality of second rectangular flat cutter blades is seated on one of the plurality of second base support surfaces; and wherein the at least one clamp member clamps the plurality of second rectangular flat cutter blades to said second groove wall.

5. A helical rotary cutter as set forth in claim 4 wherein the at least one clamping member is a plurality of wedge members each of which clamps one of the plurality of rectangular flat cutter blades to the first wall and one of the plurality of second rectangular flat cutter blades to the second groove wall.

6. A helical rotary cutter comprising:

a rotor having an outer surface, a left end, a right end, a rotor axis, a left end bearing support concentric with the rotor axis and extending axially to the left of the left end, and a right end bearing support concentric with the rotor axis and extending axially to the right of the right end;

at least one groove in said rotor extending from the left end to the right end;

a first groove wall in a first wall plane extending axially from the left end to the right end, extending outward away from the rotor axis and in the direction of rotation, and wherein said first wall plane intersects the rotor axis;

a plurality of first base support surfaces, that are each in a base support plane that is perpendicular to the first wall plane and wherein all the base support planes that are perpendicular to said first groove wall intersect each other;

a plurality of first rectangular flat cutter blades each of which has a left blade end, a right blade end, a cutting edge and a base that is parallel to the cutting edge and wherein the base of each of the plurality of first rectangular cutter blades is seated on one of the plurality of first base support surfaces;

a second groove wall in a second wall plane extending axially from the left end to the right end, extending outward away from the rotor axis and in the direction of rotation, and wherein said second wall plane intersects the rotor axis;

a plurality of second base support surfaces, that are each in a second base support plane that is perpendicular to the second wall plane and wherein all the second base support planes that are perpendicular to said second wall plane intersect each other;

a plurality of second rectangular flat cutter blades each of which has a left blade end, a right blade end, a cutting edge and a base that is parallel to the cutting edge and wherein the base of each of the plurality of second rectangular flat cutter blades is seated on one of the plurality of second base support surfaces; and a plurality of clamp members each of which clamps one of said plurality of first rectangular flat cutter blades to one of the plurality of first base support surfaces, and clamps one of said plurality of second rectangular flat cutter blades to one of the plurality of second base support surfaces.

7. A helical rotary cutter as set forth in claim 6 wherein said rotor has a plurality of grooves that are identical to and angularly spaced from the at least one groove, about the rotor axis.

8. A helical rotary cutter as set forth in claim 6 wherein the plurality of first base support surfaces includes four first base support surfaces; and the plurality of second base support surfaces includes four second base support surfaces.

9. A helical rotary as set forth in claim 8 wherein the said rotor has a plurality of grooves that are identical to and angularly spaced from the at least one groove, about the rotor axis.

10. A method of making a helical rotary cutter comprising machining a plurality of grooves in a steel cylinder that are angularly spaced from each other about a rotor axis;

machining a first groove wall, in each of said plurality of grooves, that is in a first wall plane extending axially from a left cylinder end wall to a right cylinder end wall, extending outward away from the rotor axis, and wherein said first wall plane intersects the rotor axis;

machining a plurality of first base support surfaces, in each of said plurality of grooves, that are each in one of a plurality of first base support planes that are perpendicular to the first wall plane and with the plurality of first base support planes intersecting each other and wherein a right end and a left end of each of the first base support surfaces are spaced equal distances from said rotor axis;

machining a second groove wall, in each of said plurality of grooves, that is in a second wall plane extending axially from the left cylinder end wall to the right cylinder end wall, extending outward away from the rotor axis, and wherein said second wall plane intersects the rotor axis;

machining a plurality of second base support surfaces, in each of said plurality of grooves, that are each in one of a plurality of second base support planes that are perpendicular to the second wall plane and with the plurality of second base support planes intersecting each other and wherein a right end and a left end of each of the second base support surfaces are spaced equal distances from said rotor axis;

mounting a first rectangular flat cutter blade with a first cutter base that is parallel to a first cutter cutting edge on each of said plurality of first base support surfaces;

mounting a second rectangular flat cutter blade with a second cutter base that is parallel to a second cutter cutting edge on each of said plurality of second base support surfaces; and clamping the first rectangular flat cutter blades and the second rectangular flat cutter blades in the plurality of grooves.

11. A helical rotary cutter comprising:

a rotor having an outer surface, a left end, a right end, a rotor axis, a left end bearing support concentric with the rotor axis and extending axially to the left of the left end, and a right end bearing support concentric with the rotor axis and extending axially to the right of the right end;

a plurality of grooves in said rotor extending from the left end to the right end;

a first groove wall in a first wall plane extending axially from the left end to the right end, and extending outward away from the rotor axis and in the direction of rotation;

a plurality of first base support surfaces, that are each in a base support plane that is perpendicular to the first wall plane and wherein all the base support planes that are perpendicular to said first groove wall intersect each other;

a plurality of first rectangular flat cutter blades each of which has a left blade end, a right blade end, a cutting edge and a base that is parallel to the cutting edge and wherein the base of each of the plurality of first rectangular cutter blades is seated on one of the plurality of first base support surfaces; and at least one clamp member clamping the plurality of first rectangular flat cutter blades to the first groove wall.

12. A helical rotary cutter comprising:

a rotor having an outer surface, a left end, a right end, a rotor axis, a left end bearing support concentric with the rotor axis and extending axially to the left of the left end, and a right end bearing support concentric with the rotor axis and extending axially to the right of the right end;

a plurality of grooves in said rotor extending from the left end to the right end;

a first groove wall in a first wall plane extending axially from the left end to the right end, extending outward away from the rotor axis and in the direction of rotation, and wherein said first wall plane intersects the rotor axis;

a plurality of first base support surfaces, that are each in a base support plane that is perpendicular to the first wall plane and wherein all the base support planes that are perpendicular to said first groove wall intersect each other;

a plurality of first rectangular flat cutter blades each of which has a left blade end, a right blade end, a cutting edge and a base that is parallel to the cutting edge and wherein the base of each of the plurality of first rectangular cutter blades is seated on one of the plurality of first base support surfaces;

at least one clamp member clamping the plurality of first rectangular flat cutter blades to the first groove wall;

a second groove wall in a second wall plane extending axially from the left end to the right end, extending outward away from the rotor axis and in the direction of rotation, and wherein said second wall plane intersects the rotor axis;

a plurality of second base support surfaces, that are perpendicular to said second groove wall, and that are each in a second base support plane that is perpendicular to the second wall plane and wherein all the second base support planes that are perpendicular to said second wall plane intersect each other;

a plurality of second rectangular flat cutter blades each of which has a left blade end, a right blade end, a cutting edge and a base that is parallel to the cutting edge and wherein the base of each of the plurality of second rectangular flat cutter blades is seated on one of the plurality of second base support surfaces; and wherein the at least one clamp member clamps the plurality of second rectangular flat cutter blades to said second groove wall.

13. A helical rotary cutter as set forth in claim 12 wherein the at least one clamping member is a plurality of wedge members each of which clamps one of the plurality of rectangular flat cutter blades to the first wall and one of the plurality of second rectangular flat cutter blades to the second groove wall.

* * * * *